United States Patent [19]

Chalkley

[11] 3,710,109
[45] Jan. 9, 1973

[54] PRECISION DOSIMETRY OF HIGH ENERGY RADIATION

[76] Inventor: Lyman Chalkley, 6626 Tyrian Street, La Jolla, Calif. 92037

[22] Filed: May 27, 1970

[21] Appl. No.: 41,088

[52] U.S. Cl.............................................250/83 CD
[51] Int. Cl................................................G01t 1/04
[58] Field of Search.........................250/83 CD, 65 F

[56] References Cited

UNITED STATES PATENTS

| | | | |
|---|---|---|---|
| 2,936,276 | 5/1960 | Chalkley | 250/83 CD X |
| 2,939,959 | 6/1960 | Linschitz | 260/83 CD |

Primary Examiner—Archie R. Borchelt

[57] ABSTRACT

In the use of dye cyanide solutions for the dosimetry of radiations with energies above 6.5 electron volts precision is attained by de-aeration of the dye cyanide solution and irradiation under conditions that exclude gaseous oxygen.

8 Claims, No Drawings

PRECISION DOSIMETRY OF HIGH ENERGY RADIATION

This invention relates to an improvement in the chemical dosimetry of high energy radiation, and especially in the use of liquid dye cyanide solutions for this purpose.

Photosensitive solutions of the dye cyanides have been used as chemical actinometers for the measurement of doses of ultraviolet radiation in the energy range of approximately 3.8 to 5.5 electron volts (L. Harris and J. Kaminsky, Journal of the American Chemical Society, volume 57, page 1154 (1935)), and dye cyanide sensitized papers and films have been used for dosimetry in the same region (L. Chalkley, Journal of the Optical Society of America, volume 42, page 387 (1952)). More recently the dye cyanide sensitized papers and films have been used for dosimetry of higher energy radiation (W. L. McLaughlin and L. Chalkley, Photographic Science and Engineering, volume 9, page 159 (1965)).

However, when dosimetry of higher energy radiation was attempted with dye cyanides in liquid solution it was found that the results were not constant and reproducible. The quantum yield of dye in irradiated dye cyanide solutions remained constant for radiation energies below about 6 electron volts, and precision dosimetry was possible. But with radiation of energy above about 6.5 electron volts the quantum yield and dosimetry measurements were generally erratically lower, the dosimetric reading varying with the history of the solution and the conditions under which it was used.

In the present patent application dye cyanide means a colorless triarylacetonitrile derivative that yields a colored substance on irradiation under suitable conditions. Many of these are already known. Photoactivating liquids are solvents that form photosensitive solutions of dye cyanides. Radiation includes light and other electromagnetic energy and energetic particles such as alpha particles, beta particles, electron beams, cathode rays, positive rays, etc. Dosimetry means the measurement of radiation. The chemical system that measures dosage is referred to as a dosimeter or actinometer; the words are used here interchangeably. An inactive gas means a chemically inert gas free of gaseous oxygen, and includes vapors of solvents. Ampoule means a bottle like container that can be sealed to form a gas tight closure. It may be of cylindrical, rectangular, square or other geometrical cross section. Sealing means closure of an ampoule by melting its walls together. De-aeration means the removal of air, and more specifically of oxygen.

EXAMPLE 1

A low pressure hydrogen arc lamp is fitted with a fluorite sheet that serves also as the window for a container filled with a solution of a dye cyanide in pure methanol. The lamp is operated for a measured time at constant voltage so as to provide a fixed dosage of radiation to the dye cyanide solution. The irradiated solution is transferred to a 1 cm optical path spectrophotometer absorption cell and its optical density measured at the wave length of the maximum absorption of the dye formed on irradiation.

When this experiment is repeated several times it is found that the optical densities produced by irradiation vary with the history of the dye cyanide solution before and during irradiation. Solutions that have been stored for some time before use yield generally lower optical densities than solutions prepared at the boiling point of the solvent, quickly cooled in a closed vessel and irradiated immediately. Stored solutions that have been protected from the air during storage yield higher densities than solutions stored in contact with air, and if the dye cyanide solution is de-aerated and protected from contact with air before and during irradiation the optical density is at a maximum and reproducible. The disturbing influence of air is due to its oxygen content.

When the fluorite window of the above apparatus is replaced by a 1 cm thick window of fused quartz irradiation produces the same optical density whether the solution has been saturated with air or de-aerated, showing that the presence of air interferes with dosimetry only of radiation absorbed by fused quartz. The interference becomes noticable at radiation energies above approximately 6.5 electron volts and is present at all higher energies and with all types of radiation, whether electromagnetic or corpuscular.

The anomalous behavior of dye cyanide dosimeters at energies above 6.5 electron volts is quite unexpected not only because there was no mention of such an effect in the original work of Harris and Kaminsky, referred to above, but also because the more recent detailed instructions for the use of dye cyanide dosimeters by J. G. Calvert and H. J. L. Rechen in the Journal of the American Chemical Society volume 74, page 2101 (1952) did not indicate any need for the de-aeration of the dye cyanide solutions or any adverse effect of air or oxygen upon them. The anomaly is still more surprising because it is observed only in liquid dye cyanide preparations and was not observed in the dosimetry of high energy radiations by dye cyanides used in the form of solid sensitized films and papers — see the publication of McLaughlin and Chalkley referred to above.

The use of dye cyanide dosimeters in the form of liquid solution has a number of advantages over the use of films and papers for the dosimetry of high energy radiation. For example, the dye cyanides are more soluble in a number of liquid solvents than in solid solvents and films. As a result, a given thickness of solution can respond to a lower dose of radiation than the same thickness of film. Moreover, it is practicable to employ much greater thicknesses of liquid solutions than of solid films with a resulting major increase in the sensitivity of the dosimeter. Another advantage is that after a given quantity of solution has been irradiated to form the color that is the measure of the radiation dose, the thickness or concentration of the solution may easily be adjusted so as to use the color measuring equipment in its range of optimum precision, whereas the color of an irradiated film cannot readily be subdivided in a quantitative manner and must be measured in its original form, which may have a color density that is not within the range of greatest precision of a densitometer, or even within the range of the densitometer at all.

For ordinary photochemical applications the liquid dye cyanide dosimeters have some distinct advantages over other types of liquid dosimeters. They are ten times as sensitive as the standard potassium ferrioxalate actinometer, and another order of magnitude more sensitive than the classical uranyl oxalate actinometer. Also they have a constant quantum yield over the usual spectral range of 2,450 to 3,300 A, whereas the quantum yields of the ferrioxalate and uranyl oxalate actinometers vary with wave length. They also have a limitation in that the dye formed in the photoreaction absorbs actinic radiation and produces a self filtering effect that can lead to low readings unless the intensity of light being measured is held to low values. But this limitation does not apply in the dosimetry of X-Rays, gamma rays, beta rays and high energy electron beams. The dye formed by radiolysis is no more opaque to such high energy radiation than is the unirradiated dye cyanide.

Thus the liquid dye cyanide dosimeters are potentially very useful for the dosimetry of higher energy radiations as well as in the ultraviolet range, and the present process makes it possible to expand their use for precision measurement from the ultraviolet to the realm of maximum energy gamma rays and electron beams.

In practice, dosimeter solutions are prepared from a dye cyanide and a photoactivating liquid. For short wave ultraviolet applications solvents are chosen that are relatively transparent to this region, such as methyl and ethyl alcohol. For X-Rays and other higher energy radiations ultraviolet transparency of the solvent is no longer important and any photoactivating liquids that are reasonably transparent to visible light may be employed. It is preferable that the solvents for the dosimetry of higher energy radiations be composed of light elements and be relatively free of elements having atomic numbers greater than 17. Examples of good solvents for use with higher energy radiations are, water, ethyl alcohol, methyl alcohol, i-propyl alcohol, formamide, dimethyl formamide, diethyl formamide, dimethyl acetamide, 2-methoxy ethanol, 2-ethoxy ethanol, triethyl phosphate, dimethyl sulfoxide, ethylene glycol, propylene glycol, acetic acid, 2-chloro ethanol. Many others are suitable.

Examples of dye cyanides suitable for use in dosimeter solutions are 4,4',4''-triamino-triphenylacetonitrile; 4, 4',4''-triamino-3,3',3''-trimethyl-triphenylacetonitrile; 4, 4'-bis-dimethylamino-triphenylacetonitrile; 4, 4'-bis-diethylamino-triphenylacetonitrile; 4, 4',4''-tris-dimethylamino-triphenylacetonitrile; 4, 4',4''-trihydroxytriphenylacetonitrile; 4, 4'-bis-dimethylaminotriphenylacetonitrile-4''-sulfonic acid. Many others can be used.

The present improvement in dosimetry with dye cyanides involves the use of liquid dye cyanide solutions in a de-aerated condition. The radiation sensitive solution is free of dissolved oxygen and throughout irradiation is maintained in an atmosphere free of oxygen. De-aeration of the dye cyanide dosimeter solution may be carried out in a variety of ways. An inactive gas, such as argon, hydrogen or helium, may be bubbled through the solution until all dissolved oxygen has been removed. Another method of de-aeration is to boil the solution in a volatile solvent until the dissolved oxygen has been swept out with the vapor of the solvent. A third method is to subject the solution to a vacuum until the dissolved oxygen has been pumped out. To maintain the atmosphere above the solution free of oxygen during irradiation an inactive gas, such as argon, hydrogen, nitrogen or helium, may be bubbled through the solution during irradiation; or the solution may be held under vacuum during irradiation; or the solution may be sealed in an airtight vessel under one of the above inactive gases or the pure vapor of the solvent, which is also an inactive gas.

After the dosimeter solution has been de-aerated and irradiated under oxygen free conditions the optical density of the dye formed by irradiation is measured. This measurement and all operations subsequent to irradiation may be carried out in presence of air because the precision of dosimetry is reduced by the presence of oxygen only during irradiation.

The measurement of the amount of dye formed by the radiation dose may be carried out visually or instrumentally. Visually it is most convenient to match the color of the irradiated solution with the color of a standard solution of known concentration of the same dye in the same solvent that is used in the dosimeter solution. Instrumentally the amount of dye formed by irradiation may be determined most precisely by a spectrophotometer operated at, or near, the wave length of maximum absorption of an absorption band of the dye formed by irradiation. A densitometer equipped to measure the transmission density of colored materials also may be employed. The color measurements may be made in the vessel in which the irradiation was carried out, or the solution may be transferred to a spectrophotometer absorption cell or other convenient container.

The dosimeter system is best calibrated by the measurement of its response to known dosages of radiation provided by exposure to a beam of known intensity for a given length of time. The calibration may be expressed in quanta, roentgen, ergs or other units useful for measuring quantities of the type of radiation under study.

Dosimetry may be carried out on divided or transmitted beams so as to monitor radiation experiments while they are in progress, or it may be used to calibrate an irradiation apparatus and supply a dosage rate factor to be applied to the dosimetry of subsequent irradiations in the same apparatus.

The operation of the system will be illustrated in greater detail by the following examples, although the invention is in no way limited to them. In work with dye cyanide solutions the laboratory illumination should be free of ultraviolet radiation, which might cause fogging or discoloration and false results. Fluorescent and incandescent lamps in yellow envelopes provide safe laboratory lighting, as does daylight filtered through ultraviolet-absorbing glass or plastic sheeting.

EXAMPLE 2

The dosimetry of long wave length Schumann region radiation up to an energy of 7.7 electron volts for photochemical work is carried out in a gas tight box in which the light source, such as a hydrogen or helium discharge tube equipped with a fluorite window, the fluorite or grating monochromator and the dosimeter solution contained in a 1 cm thick absorption cell fitted with a fluorite window are assembled and maintained in an inactive gas, such as helium, argon, nitrogen or hydrogen, under atmospheric pressure. The dosimeter cell is filled with a solution made by dissolving 0.5 g of 4, 4′,4″-tris-di(2-hydroxyethyl)amino-triphenylacetonitrile in 100 ml of spectroscopically pure methanol. The dosimeter solution is de-aerated before use by boiling it in a flask fitted with a reflux condenser while oxygen free nitrogen is passed through the flask until the solution and the gas above it are free of oxygen. The de-aerated solution is cooled under nitrogen to room temperature and transferred in an atmosphere of nitrogen to the absorption cell, which is preferably, although not necessarily, of the bottle type fitted with a ground glass stopper. The filled absorption cell is positioned, still in an atmosphere of nitrogen, before the exit slit of the monochromator where it will be traversed by the Schumann radiation beam that is to be measured. The gas tight box is then closed and swept out with nitrogen or other inactive gas, and the dosimeter solution irradiated with the dose to be measured. The subsequent operations are carried out in the normal atmosphere of the laboratory.

The optical density of the irradiated solution is measured at 599 nm, most conveniently in the cell in which it was irradiated. However, it may be transferred for measurement to a different absorption cell if such is required by the spectrophotometer employed. The measured optical density is converted into a first approximation of radiation dosage in quanta by calculations based on a molecular extinction coefficient of $4 \times 10^4$ for the dye produced by photolysis and a quantum yield of 1 for the efficiency of photochemical conversion into the dye. Thus, if D is the optical density measured at 599 nm in a 1 cm thick cell the dosage of radiation to which the dosimeter solution was exposed is approximately:

$(D \times 6 \times 10^{23})/(4 \times 10^4)$ quanta.

Detailed and stepwise descriptions for the calculation of dosage from actinometric measurements are given in textbooks on photochemistry, such as on pages 106–108 of "Photochemical Reactions" by W. Albert Noyes, Jr., and V. Boekelheide in "Technique of Organic Chemistry," 1st edition, volume 2, edited by Arnold Weissberger, published 1948 by Interscience Publishers, New York.

For more precise work the dosimeter should be calibrated under conditions of use by physical measurement of the intensity of the light beam.

This example appears to provide the first liquid dosimeter for the measurement of small radiation dosages within any part of the Schumann region. Results are most dependable for low intensity radiations with an energy input of less than $10^{12}$ quanta per second.

EXAMPLE 3

For the dosimetry of gamma rays, high energy electron beams and X-Rays the dosimeter solution is sealed in 5 ml ampoules. To prepare the solution 1 g of 3,3′,3″4, 4′,4″-triamino-triphenylacetonitrile is put in the two liter receiver of an all glass distilling apparatus with 1 ml of acetic acid. The distilling flask is charged with 2-methoxy-ethanol, and the apparatus swept out with pure argon. The 2-methoxy-ethanol is distilled while argon is passed through the apparatus until 1 liter has collected in the receiver with the dye cyanide and acetic acid. The dye cyanide dissolves readily to a clear, colorless, de-aerated dosimeter solution.

Amber glass ampoules are filled under argon with the de-aerated solution and the stems sealed to provide samples of solution confined permanently in an atmosphere of argon. The pressure of argon in the ampoules is not critical and may conveniently vary from atmospheric down to the vapor pressure of the solvent.

The use of amber glass ampoules protects the solution from discoloration by ultraviolet radiation present in daylight and in the output of white fluorescent lamps. The amber glass is essentially as transparent to gamma rays, etc., as colorless glass.

In use an ampoule is exposed to the high energy radiation until the solution has become colored. The ampoule is then opened and the irradiated solution poured (protection from the atmosphere is no longer necessary) into a spectrophotometer absorption cell and its optical density determined at the wavelength corresponding to the maximum of the visible absorption band, which is near 556 nm. The optical density varies with radiation dosage, and the absolute dosage is determined by calibration of the ampoule dosimeter by a radiation source of known intensity.

EXAMPLE 4

For the same uses as in example 3 the dosimeter solution is prepared by distillation of 1 liter of absolute i-propanol into a receiver containing 1 g of 4, 4′-bis-dimethylamino-triphenylacetonitrile and 2 ml of acetic acid. The distillation is carried out in an atmosphere of oxygen-free nitrogen. The resulting clear, colorless solution is sealed under nitrogen in amber glass ampoules. The optical density of the irradiated solution is determined in the unopened ampoule at the wavelength of maximum absorption, about 620 nm. There is little reduction in precision of measurement caused by the color of the amber ampoule.

EXAMPLE 5

One-half gram of 4, 4′,4″-tris-dimethylaminotriphenylacetonitrile is dissolved in 1 liter of N, N′-dimethylformamide that has been freshly distilled in vacuo. Hydrogen is bubbled through the solution until all oxygen has been removed from it and the gas above it. Colorless glass ampoules are filled under hydrogen with the solution and sealed, with hydrogen remaining as the residual gas above the liquid. During preparation, storage and irradiation by X-Rays, gamma rays, electron beams or the like, the ampoules are protected from ambient ultraviolet radiation so as to avoid fogging of the solution. The optical density of the dye formed by irradiation of the solution may be measured instrumentally at the absorption peak near 597 nm, or the dye may be estimated visually by comparison of its color with that of standard solutions of known concentration of the dye, crystal violet.

EXAMPLE 6

After filling and sealing, the ampoules of Example 5 are dipped in a solution of cellulose acetate containing 1 ½ percent (based on the weight of the cellulose acetate) of 2, 2'-dihydroxy-4, 4'-dimethoxybenzophenone and the solvent evaporated so as to leave the ampoules coated with an ultraviolet absorbing, clear, nearly colorless film that protects the solution from discoloration by exposure to outdoor daylight or white fluorescent lamps and yet transmits the visible range of the spectrum. The ultraviolet absorbing plastic coating is an alternative to the use of amber glass ampoules. It makes it possible to handle the ampoules freely under ordinary illumination and to measure the amount of dye formed either instrumentally or visually without opening the ampoules.

EXAMPLE 7

Five grams of 4, 4',4''-tris-di(2-hydroxyethyl)aminotriphenylacetonitrile is dissolved at room temperature in 1.1 liters of methanol and 5 ml of acetic acid is added to make the dosimeter solution. Amber glass ampoules are filled with the solution. The stem of each ampoule, which is held in an upright position, is attached to a vacuum pump and the vapor space above the liquid evacuated until the methanol begins to boil. Boiling is continued, if necessary by the supply of heat to the ampoule, until 10 percent of the volume of methanol has evaporated through the stem. The stem is then sealed off to provide a de-aerated dosimetric solution covered by solvent vapor in the sealed ampoule. After irradiation by gamma rays or similar high energy radiation the optical density of the dye formed in the solution is measured at 598 nm. The measurement may be made in the unopened ampoule, or after transferring the irradiated solution to a spectrophotometer absorption cell.

The above examples illustrate the practice of the invention and varied applications. Other applications will occur to those skilled in the art, and it is obvious that various changes may be made in the specific details without departing from the spirit and scope of the invention.

I claim:
1. The process for the measurement by chemical dosimetry of dosages of radiation with energy above 6.5 electron volts that comprises the steps of:
   a. irradiation of a de-aerated liquid solution of a dye cyanide in a photoactivating solvent in contact with inactive gas by radiation having an energy above 6.5 electron volts,
   b. determination of the amount of dye formed in step (a) by optical measurement of the light absorption of the solution,
   c. calculation by the known methods of dosimetry of the dose of radiation from the amount of dye formed by the irradiation of step (a) and determined in step (b)
2. The process of claim 1 in which the de-aerated liquid solution of dye cyanide and inactive gas are sealed within an ampoule during irradiation.
3. The process of claim 2 in which the step (b) determination of the amount of dye formed is made by visual comparison of the color of the irradiated solution with the color of a standard solution of known dye concentration.
4. The process of claim 2 in which the determination of the amount of dye formed is made by instrumental measurement of of the optical density of the irradiated solution at a wavelength near the maximum absorption band of the dye formed by irradiation.
5. A product for carrying out the process of claim 1 comprising a sealed ampoule containing a de-aerated solution of a dye cyanide in a photoactivating solvent and an inactive gas.
6. The product of claim 5 in which the ampoule is made of amber glass.
7. The product of claim 5 in which the ampoule is made of colorless glass.
8. The product of claim 7 in which the colorless glass ampoule is coated with a clear, ultraviolet absorbing film.

* * * * *